United States Patent [19]

Anderson et al.

[11] 3,933,940

[45] Jan. 20, 1976

[54] MERCAPTAN BLOCKED THERMOSETTING COPOLYMERS

[75] Inventors: Carl C. Anderson, Hartland, Wis.; Rostyslaw Dowbenko, Gibsonia, Pa.

[73] Assignee: PPG Industries, Inc., Pittsburgh, Pa.

[22] Filed: Feb. 8, 1973

[21] Appl. No.: 330,815

[52] U.S. Cl.............. 260/873; 260/78.3 R; 260/79; 260/79.7; 260/827; 260/874; 260/901
[51] Int. Cl.².................. C08F 22/00; C08G 75/00; C08L 67/06
[58] Field of Search .......... 260/827, 873, 874, 901, 260/79, 79.7, 78.3 R; 117/161 K, 161 ZA, 161 UC, 161 UN

[56] References Cited
UNITED STATES PATENTS

| | | | |
|---|---|---|---|
| 3,063,971 | 11/1962 | Stuart | 260/901 |
| 3,465,057 | 9/1969 | Cameron | 260/874 X |
| 3,574,791 | 4/1971 | Sherman | 260/901 X |
| 3,749,757 | 7/1973 | Marzocchi | 260/873 X |
| 3,776,983 | 12/1973 | Iovine | 260/901 |
| 3,787,303 | 1/1974 | Guthrie | 260/873 X |
| 3,817,936 | 8/1974 | Jones et al. | 260/873 X |

*Primary Examiner*—Harris A. Pitlick
*Attorney, Agent, or Firm*—George D. Morris

[57] ABSTRACT

Block copolymers are prepared by reacting a polyester resin or polyol with a hydroxyl or carboxyl functional mercaptan and subsequently reacting the blocked polyester or polyol in the presence of oxygen, with selected vinyl monomers such as diacetone acrylamide, acrylic acid, 2-hydroxyethyl acrylate and the like. Such block copolymers provide for coating compositions having physical properties which render them useful as protective and/or decorative films.

14 Claims, No Drawings

MERCAPTAN BLOCKED THERMOSETTING COPOLYMERS

BACKGROUND OF THE INVENTION

The preparation of block copolymers are well known in the art and can be prepared by employing a number of syntheses, e.g., multifunctional initiators, radical and irradiation synthesis, mechanochemical syntheses, coupling reactions, alkylene oxides syntheses, and ionic reactions. One of the most versatile laboratory syntheses of block copolymers makes use of polymeric phthaloyl peroxide as the initiator. The first monomer is polymerized at as low a temperature as possible and to a low degree of conversion to give a polymer which, when isolated, contains segments of the polymeric initiator. By dissolving the isolated polymer in the second monomer and polymerizing at a higher temperature, block copolymeric macromolecules are synthesized. The first method of synthesizing block copolymers reported was a photoinitiation study of the vapor phase polymerization of monomers. A film of poly(methylmethacrylate) was deposited on the walls of an evacuated reaction vessel and then chloroprene vapor is admitted. This was block copolymerized by the unterminated radicals of the polymer that were first formed. The "flow method" of synthesizing block copolymers has also been employed, which consists of subjecting a photosensitized monomer to ultraviolet radiation as it passes through a capillary tube into a reservoir of a second monomer, wherein mixing takes place, Likewise, block copolymers can be synthesized by subjecting a mixture of two compatible polymers to mechanical degradation, by subjecting a mixture of two polymers to mechanical degradation in the presence of a crosslinking agent, by subjecting a polymer plasticized with a polymerizable vinyl monomer to mechanical degradation or by mechanically degrading a polymer in the presence of oxygen to introduce peroxidic groups that can be then used to initiate block copolymerization at a later stage. Degradative process takes place during mastication, milling, calendering, vibro-milling, cavitational ultrasonic irradiation, high-speed stirring and the like. Condensation reactions have been utilized to couple together polymer molecules containing hydroxyl, carboxyl, amine, thiol and certain esters to give block copolymers which are essentially linear in structure. Also employed in the art are ionic reactions to provide "living" polymers, e.g., sodium complex of naphthalene, when formed in a moisture-free tetrahydrofuran solution, is a stable green ion radical that may be used to polymerize styrene at low temperatures. These living polymers are well suited to the synthesis of block copolymers by the addition of a second monomer species which was also polymerized by an anionic mechanism. Poly(styrene-b-isoprene) poly(styrene-b-acrylonitrile), poly(styrene-b-1 vinylnaphthalene) and the like have been synthesized in this manner. Still another method employed provides for the polymerization of ethylene oxide by hydroxylcontaining compounds. Since poly(propylene oxide) has a terminal hydroxyl group, it can be used to initiate the block copolymerization of ethylene oxide to give poly(propylene oxide-b-ethylene oxide).

In the past the use of mercaptans has been limited. For example, ethyl mercaptan has been used as a starting material for making sulfonal and the lower mercaptans have been employed as odorants for natural gas. Perhaps the most important use of mercaptans is to control the polymerization in the manufacture of resin polymers and rubber compositions, large amounts of dodecyl mercaptans and other higher mercaptans are consumed in such processes. 2-mercaptobenzothiozale is an important rubber accelerator. Mercaptans are useful as oxidation inhibitors, for example, mercaptoacetic acid has been employed in hair waving processes. Mercaptans have shown to be efficacious in the treatment of wounds. Methyl mercaptan is now becoming important for the synthesis of amino acid methionine and mercaptans have also been employed as initiators for the polymerization of unsaturated carboxylic acid amides with other ethylenically unsaturated monomers.

DESCRIPTION OF THE INVENTION

Now it has been discovered that a mercaptan can be reacted with a polyester resin or polyol to form a mercapto(sulfhydryl)terminated reaction product which may subsequently be reacted in the presence of molecular oxygen, with selected vinyl monomers to provide block copolymer compositions. More particularly, this invention relates to a novel method of producing block copolymers which comprise reacting a hydroxyl or carboxyl-containing mercaptan with a polyester resin or polyol in such a manner as to provide for a mercaptoterminated reaction product that may be subsequently reacted with reactive vinyl monomers such as diacetone acrylamide, acrylic acid, 2-hydroxyethyl acrylate, and the like. The said block copolymers may be readily employed in formulating coating compositions which are useful as protective and/or decorative films.

The polyester component of this invention may be saturated, unsaturated or oil-modified, such as those polyesters well known in the art. Polyesters are prepared by reacting a polyhydric alcohol (polyol) and a polybasic acid. Such polyols include ethylene glycol, propylene glycol, butylene glycol, diethylene glycol, dipropylene triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerythritol, sorbitol, mannitol, methyl glycoside, 2,2-bis(hydroxyethoxyphenyl)propane, 2,2-bis (beta-hydroxypropoxyphenyl)propane, and the like. Monofunctional alcohols may also be employed to supplement the other polyols and to provide for a particular characteristic which is undesirable. Useful alcohols include those having a hydrocarbon chain comprising from about 13 to about 18 carbon atoms.

Generally suitable diols include glycols of the formula $HO(CH_2)_nOH$ in which n equals 2 to 10 glycols of the formulae $HO(CH_2O)_nH$ and $HO[CH(CH_3)CH_2O]_nH$ in which $n$ equals 1 to 40, such 2,2-dimethyl-1,3-propanediol, 2,2-diethyl-1,3-propanediol, 3-methyl-1,5-pentanediol, N-methyl and N-ethyldiethanolamines. Others include 4,4'-methylenebiscyclohexanol, 4,4'-isopropylidenebiscyclohexanol and various xylenediols, hydroxymethyl phenethyl alcohols, hydroxymethylphenylpropanols, phenylenediethanols, phenylene-dipropanols, and heterocyclic diols such as 1,4-piperazine diethanol and the like. Some of the preferred diols include 2-methyl-2-ethyl-1,3-propanediol, 2-ethyl-1,3-hexanediol and 2,2-dimethyl-3-hydroxypropyl-2,2-dimethyl-3-hydroxypropionate. Various other trifunctional polyols known in the art may be used.

The acid component of such polyesters may include unsaturated acids such as maleic acid, fumaric acid, itaconic acid, citraconic acid, glutaconic acid, mesaconic acid and the like and their corresponding anhydrides, where such anhydrides exist. Other polycarboxylic acids which may be utilized in addition to the above-mentioned acids include saturated polycarboxylic acids, such as succinic acid, glutaric acid, adipic acid, pimelic acid, suberic acid, azelaic acid, sebacic acid and the like. Certain aromatic polycarboxylic acids and derivatives thereof may also be useful, for example, phthalic acid, isophthalic acid, tetrahydroxyphthalic acid, hexahydroxyphthalic acid, endomethylenetetrahydroxyphthalic anhydride, tetrachlorophthalic anhydride, hexachloroendomethylenetetrahydrophthalic and the like. The term "acid" used in this specification and appended claims includes the corresponding anhydrides where such anhydrides exist.

In many instances it is optional to include a fatty acid. These include saturated fatty acids such as decanoic, dodecanoic, tetradecanic, hexadecanic, octadecanic, licosanic, docosanoic and the like; and, in addition, unsaturated fatty acids may be used, such as 9-octadecenoic, 9,12-octadecadienoic, 9,12,15-octadecatrienoic, 9,11,13-octadecatrienoic, 4-keto-9,11,13-octadecatrienoic, 12-hydroxy-9-octadecenoic, 13-docosenic, and the like.

Oil-modified polyesters are likewise suitable for purposes of this invention.

In the preparation of the oil-modified polyester resins, it is possible to replace the saturated and/or unsaturated fatty acids with monocarboxylic acids and thus further modify the properties of the end groups. Suitable monocarboxylic acids are, for example, natural resin acids such as abietic acid, neoabietic acid, laevopimaric acid, hydrogenated and particularly hydrogenated resin acids, such as dihydro- and tetrahydroabietic acid, also benzoic acid and p-tert.-butylbenzoic acid as well as technical mixtures of fatty and resinic acids known by the name of tall oil.

The preparation of the oil-modified polyester resin can be carried out either by the use of the free fatty acids or by re-esterifying the natural oils and fats, in a first step, with an equivalent quantity of polyalcohol to form the monoglycerides and then, after adding the polycarboxylic acid, completing the polycondensation. The re-esterification is suitably carried out in the presence of catalysts. Sutiable catalysts are: lithium ricinoleate, sodium alcoholates, such as sodium methylate, lead oxide, zinc oxide and zinc acetate, calcium oxide and calcium acetate.

In the preparation of the oil-modified polyester resins in accordance with the re-esterification process, it is possible to use non-drying, half-drying and drying fatty oils and fats, such as peanut oil, coconut oil, palm-kernel oil, palm oil, castor oil, hemp oil, cottonseed oil, safflower oil, soy bean oil, sunflower oil, linseed oil, wood oil, oiticica oil, perilla oil and fish oils.

In the oil-modified alkyd polyester, the percent of the oil component is between 20 and 80 percent, preferably between 30 and 65 percent. More particularly, the oil component of the resins that contain non-drying oils, such as peanut oil, coconut oil, palm-kernel oil, palm oil and castor oil is preferably between 30 and 50 percent, whereas the oil component of the resins that contain half-drying and drying oils, such as hemp oil, cottonseed oil, safflower oil, soy bean oil, sunflower oil, linseed oil, wood oil, perilla oil and fish oil is preferably between 30 and 65 percent.

Generally, in the manufacture of polyester resin, an esterification catalyst is employed. Inorganic tin salts, such as stannous halides, stannous acrylates, and stannous alkoxides, and stannic salts; and organic tin compounds. Illustrative compounds include the following:

a. stannous salts such as stannous hydroxide, stannous bromide, stannous chloride, stannous fluoride, stannous iodide and the like;
b. stannic slats such as stannic chloride, stannic bromide, stannic fluoride and the like;
c. dialkyl tin salts of carboxylic acids, such as dibutyltin diacetate, dibutyltin dilaurate, dibutyltin maleate, and the like;
d. dialkyltin oxides such as dibutyltin oxide dioctyltin oxide, dilauryltin oxide and the like; and
e. trialkyltin hydroxides such as trimethyltin hydroxide, tributyltin hydroxide, and the like.

The requisite equipment and conditions employed in the preparation of polyester resins are well known and documented in the art. Generally, the esterification reaction conducted in the presence of a suitable solvent, such as xylene, toluene, and the like. Temperatures commonly employed are from about 350°F. to about 450°F.

In addition to the polyesters described herein, a polyol alone may be blocked and subsequently reacted with vinyl monomers according to the method of this invention. Useful polyols include those mentioned hereinabove. Likewise, diols such as 2-methyl-2-ethyl-1,3-propanediol, 2-ethyl-1,3-hexanediol, polycaprolactone, 2,2-dimethyl-3-hydroxypropyl-2,2-dimethyl-3-hydroxypropionate, 4,4'-methylenebiscyclohexanol, and various xylenediols, hydroxymethyl-phenethyl alcohols, phenylenediethanols, phenylenedipropanols, heterocyclic diols and the like may be utilized.

It will be observed that the polyester or polyol herein may first be reacted with an organoalkoxysilane and then with the hydroxyl or carboxyl functional mercaptan to provide a mercapto-terminated reaction product. Suitable organoalkoxysilanes includes alpha-methacryloxypropyltrimethoxysilane, alpha-acryloxypropyltrimethoxysilane, alpha-methacryloxyethyltrimethoxysilane and the like. The amount of the organoalkoxysilane is not critical and can be varied depending on the desired results, however, the product should have at least two functional groups present for reaction with the mercaptan.

The mercaptans employed in this invention can be any carboxyl or hydroxyl mercaptan having a hydrocarbon chain which may be a saturated or unstaurated aliphatic, saturated or unsaturated alicyclic, saturated or unsaturated aliphaticaromatic, or saturated or unsaturated aromatic. The said hydrocarbon chain may contain up to about 18 carbon atoms. These hydrocarbon chains contain other substituents such as halogens, ester groups, ether groups, and the like. The only requirement is the additional substituents do not interfere with the desired reaction. Some specific examples of useful mercaptans include mercaptoacetic acid, 2-mercaptoethanol, 2,3-dimercapto-1-propanol, 2,2'-dimercaptoisobutyric acid, cysteine, o-mercaptobenzoic acid, 3-mercaptopropanol and the like.

The amount of mercaptan employed is not critical and may vary depending upon the reactivity of the mercaptan, the functionality of the polyester or polyols employed, and upon the reaction conditions. However, it is desirable to employ a molar amount sufficient to block at least two of the polyester functional groups in order to provide for a symmetrically propagated block copolymer. The blocking reaction may be conducted in solvents such as toluene, xylene, butanol, and the like. Likewise, catalysts such as those described hereinabove can be employed to accelerate the esterification reaction. The temperatures necessary to conduct this blocking reaction are generally low, for example, from about 100°C. to about 200°C. Of course, such temperature requirements will change depending on use of a catalyst and the reactivity of the components.

The mercapto blocked polyester or polyol is subsequently reacted, in the presence of molecular oxygen, with a variety of vinyl monomers to provide the blocked copolymers of the invention herein. Any available source of molecular oxygen, for example, air, is sufficient to initiate the polymerization reaction. It is believed that the mercaptan radical is produced by oxygen abstracting a mercaptan hydrogen (-SH) from the mercaptan, thus freeing the mercaptan radical to attach across the double bond of the particular unsaturated monomer(s) employed.

Generally, the monomers polymerized include an unsaturated carboxylic acid amide and at least one other ethylenically-unsaturated monomer; however, any desired monomer combination may be employed.

The amount of the particular monomers utilized is not critical and will depend on the characteristics desired to be imparted to the final block copolymer.

Amides that may be utilized include acrylamide, diacetone acrylamide, methacrylamide, itaconic acid diamide, alpha-ethyl acrylamide, crotonamide, maleamic acid and esters, maleuric acid and esters and other amides of alpha,beta-ethylenically unsaturated carboxylic acids containing up to, for example, about 10 carbon atoms. However, an acrylamide is preferred, this term being utilized to include acrylamide, diacetone acrylamide, methacrylamide and similar alpha-substituted acrylic amides, and N-substituted acrylamides, such as N-butoxymethylacrylamide and N-butoxymethylmethacrylamide.

The monomer or monomers with which the amide may be interpolymerized can be any ethylenic compound copolymerizable with the unsaturated amide, the polymerization taking place through the ethylenically unsaturated bonds. These include monoolefinic and diolefinic hydrocarbons, halogenated monoolefinic and diolefinic hydrocarbons, unsaturated esters of organic and inorganic acids, esters of unsaturated acids, nitrile, unsaturated acids, and the like. The interpolymer compositions described in U.S. Pat. No. 3,037,963 exemplifies the types of amide interpolymers to which the invention is applicable.

Examples of such monomers include the following:

1. monoolefinic hydrocarbons, such as styrene, alpha-methyl styrene, alpha-ethyl styrene, alpha-butyl styrene, and the like;

2. halogenated monoolefinic and diolefinic hydrocarbons, such as alpha-bromostyrene, 2,5-dichlorostyrene, 2,5-dibromostyrene, 3,4-dichlorostyrene, 3,4-difluorostyrene, ortho-, meta-, and parafluorostyrenes, 2,6-dichlorostyrene, 2,6-difluorostyrene, 3-fluoro-4-chlorostyrene, 3-chloro-4-fluorostyrene, 2,4,5-trichlorostyrene, dichloro-monofluorostyrenes, 1,1-dichloroethylene (vinylidene chloride, 1,1-dibromoethylene and other halogenated diolefinic compounds;

3. esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl-o-chlorobenzoate, vinyl-m-chlorobenzoate and similar vinyl habenzoates, vinyl-p-methoxybenzoate, vinyl-o-methoxybenzoate, vinyl-p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

methyl acrylate, ethyl acrylate, propyl acrylate, isopropyl acrylate butyl acrylate, isobutyl acrylate, amyl acrylate, hexyl acrylate, 2-ethylhexyl acrylate, heptyl acrylate, octyl acrylate, 3,5-5-trimethylhexyl acrylate, decyl acrylate, and dodecyl acrylate;

isopropenyl acetate, isopropenyl propionate, isopropenyl butyrate, isopropenyl isobutyrate, isopropenyl valerate, isopropenyl caproate, isopropenyl onanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

vinyl alpha-chloroacetate, vinyl alpha-bromoacetate, vinyl alphachloropropionate, vinyl alpha-bromopropionate, vinyl alpha-iodopropionate, vinyl alpha-chlorobutyrate, vinyl alpha-chlorovalerate and vinyl alphabromovalerate;

allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters;

methyl alpha-chloroacrylate, methyl alpha-bromoacrylate, methyl alpha-fluoroacrylate, methyl alpha-iodoacrylate, ethyl alphachloroacrylate, propyl alpha-chloroacrylate, isopropyl alpha-bromoacrylate, amyl alpha-chloroacrylate, octyl alpha-chloroacrylate, octyl alphachloroacrylate, 3,5,5-trimethylhexyl alpha-chloroacrylate, decyl alphachloroacrylate, methyl alpha-cyanoacrylate, ethyl alpha-cyanoacrylate, amyl alpha-cyanoacrylate and decyl alpha-cyanoacrylate;

dimethyl maleate, diethyl maleate, diallyl maleate, dimethyl fumarate, diethyl fumarate, dimethallyl fumarate and diethyl glutaconate;

4. organic nitriles such as acrylonitrile, methacrylonitrile, ethacrylonitrile, 3-octenenitrile, crotonitrile, oleonitrile, and the like;

5. acid monomers such as acrylic acid, methacrylic acid, crotonic acid, 3-butenoic acid, angelic acid, tiglic acid, and the like.

It is understood that the above polymerizable olefinic monomers are representative only, and do not include all of the $CH_2= C<$ containing monomers which may be employed.

However, for purposes of the invention, the preferred monomers include acrylates, methacrylates, vinyl aromatic hydrocarbons, unsaturated acids, and unsaturated esters of organic acids.

Generally, the blocked copolymers of the invention may be prepared by any of the techniques know in the art, however, for purpose of this invention, the batch type process and continuous addition method are preferred.

The polymerization generally requires no external heat source, but the preferred temperature of operation depends somewhat on the reactivity of the monomer(s) employed and the amount of the mercaptan utilized. Generally, however, the polymerization of this invention may be carried out at as low as about 20°C. to as high as about 300°C. Thus, depending on the desired end results, amides, mercaptans and unsaturated monomers utilized, the use of an external heat source may be negated or such heat source may be employed to accelerate the reaction.

The reaction generally is carried out in an organic solvent in which the monomers are soluble at reaction temperature. Butanol or other lower alkanols, the Cellosolves and Carbitols, e.g., ethyl Cellosolve and butyl carbitol, are satisfactory for this purpose. Butyl or ethyl acetate or other ester solvents can also be included in the reaction medium, as can aliphatic and aromatic hydrocarbons, such as toluene, xylene, naphthas and the like. Ketones may also be utilized, for instance, methyl ethyl ketone.

The block copolymers of this invention may be blended or admixed with other co-curing or crosslinking resins or reactive materials such as vinyl chloride; the alkyd resins, both oil-modified and non-oil modified; epoxidized oils, that is, epoxidized fatty acid esters, preferably containing at least 8 carbon atoms; amide resins, such as urea-formaldehyde resins and melamine-formaldehyde resins; nitrocellulose resins; hydrocarbon resins, such as polyethylene and polypropylene; phenolic resins, as well as any other resinous materials compatible with the block copolymers herein.

When the block copolymer and blends described above are utilized in forming coating compositions, pigments, such as titanium dioxide, carbon black, talc, barytes, zinc sulfate, strontium chromate, barium chromate, ferric iron oxide, as well as color pigments, such as cadmium yellow, cadmium red, toluidine red, hydrated iron oxide, and the like may be added to form any desired color and to enhance the film properties. The coating compositions are produced by blending the resinous vehicle and desired pigment composition and grinding in accordance with wellknown practice.

The coating compositions so produced can be applied by ordinary methods of application, for example, by reverse roll coat, spraying, and dipping or by similar conventional techniques, and then baked to form a hard, tough, adherent film. Typical baking schedules include 30 minutes at 300°F. to 1 minute at 500°F.

The mechanical apparatus utilized in the manufacture of the block polymers consists of that commonly known in the art. Generally, the ingredients are admixed and charged into a reaction vessel equipped with continuously operating electrical or air-operated stirrer, a thermometer, a heating jacket or mantle, and a distilling column.

To illustrate the manner of producing the blocked copolymers of this invention, there are set forth below several examples of their preparation. The parts and percentages are by weight and are based upon nonvolatile resin solids content.

EXAMPLE I

A blocked intermediate was prepared in the following manner:

Blocked Intermediate A

A three-necked round-bottom reactor vessel was equipped with a thermometer, reflux condenser, mechanical stirrer and a means to provide an inert blanket of nitrogen gas. Into the said vessel the following components were charged:

|  | Parts by Weight |
|---|---|
| Mercaptoacetic acid (98% pure) | 184.00 |
| Polycaprolactone | 125.0 |
| Toluene | 50.0 |
| Phosphoric acid (85% pure) | 0.7 |

The above components were heated over one hour period to a temperature of 150°C. and 50.0 parts of toluene were added. The reaction continued for 25 minutes and an additional 40.0 parts of toluene were added and 20 minutes later a further addition of 40.0 parts of toluene were added. Again, the reaction was permitted to continue for 3¼ hours and thereafter 18.0 parts of mercapto acetic acid were added, the reaction temperature was maintained at 150°C. for about 6 hours. During the reaction time, a total of 34.0 parts were collected as a byproduct of the esterification process.

This intermediate was employed in the following manner to provide a blocked copolymer.

|  | Parts by Weight |
|---|---|
| Diacetone acrylamide | 300.0 |
| 2-hydroxyethyl acrylate | 60.0 |
| Acrylic acid | 60.0 |
| Methyl methacrylate | 780.0 |
| Blocked intermediate A (above) | 750.0 |

A total of 500.0 parts of the above mixture was charged into a four-necked round bottom reactor vessel equipped with a thermometer, reflux condenser, mechanical stirrer and a dropping funnel into which the remainder of the above mixture was charged.

Initially the 500.0 parts were heated to a temperature of about 125°C. under a blanket of air. After about 25 minutes, the stopcock of the dropping funnel was opened and the remainder of the above mixture was permitted to slowly enter the reaction vessel over a 2 hour period. Thereafter, the reaction was allowed to continue for about 6 hours while the temperature was maintained at about 112°C. Finally, the blocked copolymer was cooled and reduced with 200.0 parts butyl Cellosolve. The blocked copolymer produced in Example I had the following characteristics:

| Total solids content (percent) | 74.1 |
|---|---|
| Viscosity (Gardner-Holdt) | Z-6 |
| Color (Gardner) | 3 |
| Acid number | 25.33 |

EXAMPLE II

A blocked intermediate similar to that provided in Example I except that the polycaprolactone was first reacted with an organoalkoxysilane.

| | Parts by Weight |
|---|---|
| Polycaprolactone | 1060.0 |
| Alpha-methacryloxypropyltrimethoxysilane | 1060.0 |
| Xylene | 600.0 |

The above components were charged into a reactor vessel as in Example I and heated to 90°C. under an inert atmosphere of nitrogen. A 75 percent solution of butanol containing 1.0 part phenyl acid phosphate was added and the reaction temperature rose to about 150°C. and was maintained there for 4 hours. Then 93 parts of Thiovanic Acid (98.6 percent pure) were added when the temperature was lowered to about 110°C. and the temperature was permitted to rise over a 2 hour period to 148°C. A total of 55 parts of water were azeotropically distilled off. The intermediate provided had the following characteristics:

| | |
|---|---|
| Total solids content (percent) | 78.4 |
| Viscosity (Gardner-Holdt) | R+ |
| Color (Gardner) | 1– |
| Acid number | 15.1 |

The intermediate herein was employed to provide the following block copolymer.

Monomer Mixture

| | Parts by Weight |
|---|---|
| Diacetone acrylamide | 375.0 |
| 2-Hydroxyethyl acrylate | 75.0 |
| Methacrylic acid | 30.0 |
| Ethyl acrylate | 270.0 |

A total of 975.0 parts of the intermediate above and 3750 parts of the monomer mixture above were charged into a reactor vessel and the contents were heated to reflux, 112°C., and the remaining portion of the monomer mixture was added over 1½ hours as the temperature rose to 127°C. The reaction was maintained at reflux (127°C.) for 6½ hours, then 20.0 parts of the Thiovanic Acid were added as the reaction was permitted to continue for 11 hours. The blocked copolymer produced had the following characteristics:

| | |
|---|---|
| Total solids content (percent) | 71.6 |
| Viscosity (Gardner-Holdt) | Z-1 |
| Color (Gardner) | 11 |
| Acid number | 21.8 |

The blocked intermediates of Example I and Example II may be reacted with monomer mixtures other than the ones shown to provide suitable block copolymers. Examples of useful monomer mixtures are set forth below:

MIXTURE A

| | Parts by Weight |
|---|---|
| Ethyl acrylate | 160.0 |
| Diacetone acrylamide | 160.0 |
| 2-Hydroxyethyl acrylate | 40.0 |
| Acrylic acid | 40.0 |

MIXTURE B

| | |
|---|---|
| Ethyl acrylate | 300.0 |
| Diacetone acrylamide | 60.0 |
| Acrylic acid | 40.0 |

MIXTURE C

| | |
|---|---|
| Ethyl acrylate | 900.0 |
| Diacetone acrylamide | 450.0 |
| Acrylic acid | 180.0 |
| 2-Hydroxyethyl acrylate | 186.0 |
| Butyl acrylate | 90.0 |

-continued
MIXTURE A

MIXTURE D

| | Parts by Weight |
|---|---|
| Diacetone acrylamide | 50.0 |
| Acrylic acid | 20.0 |
| 2-Ethylhexyl acrylate | 60.0 |
| Vinyl acetate | 40.0 |
| 2-Hydroxyethyl acrylate | 30.0 |

These monomer mixtures, when reacted with the blocked intermediates provide compositions that can readily be formulated into coatings that are useful for many purposes.

Polyesters and polyols other than those employed hereinabove may be utilized where desired. For example, any saturated, unsaturated, or oil-modified polyester known in the art may be employed. Likewise, other polyols such as propylene glycol, 1,5-pentanediol, trimethylolethane, pentaerythritol and the like can be substituted for those hereinabove.

Other mercaptans that are useful and can be readily employed include cysteine, 2,2'-dimercapto-1-propanol, 0-mercaptobenzoic acid, and the like.

In addition, some of the other ethylenically unsaturated monomers that may be utilized include methacrylamide, acrylamide, styrene, alpha-methyl styrene, alpha-bromo styrene, vinyl acetate, vinyl propionate, dimethyl maleate methacrylonitrile, acrylic acid and the like.

Also the block copolymers can be blended or admixed with reactive materials such as amino resins like hexamethoxymethyl melamine, ethoxymethoxymethyl melamine, and the like, as well as phenolic resins and alkyd resins.

Various properties and desirable characteristics can be imparted to the block copolymers or blends by grinding pigments such as titanium dioxide, carbon black, ferric iron oxide, cadmium red, toluidine red and the like.

According to the provisions of the patent statutes, there are described above the invention and what are now considered to be its best embodiments. However, within the scope of the appended claims, it is to be understood that the invention can be practiced otherwise than as specifically described.

We claim:

1. A method which comprises the steps of:
 A. esterifying a polyester resin with a hydroxyl functional mercaptan having a hydrocarbon chain containing up to about 18 carbon atoms or a carboxyl functional mercaptan having a hydrocarbon chain containing up to about 18 carbon atoms in a molar amount sufficient to block at least two polyester functional groups of said polyester resin to provide a mercapto-terminated reaction product; and
 B. reacting said mercapto-terminated reaction product in the presence of molecular oxygen with one or more ethylenically-unsaturated monomers to produce a thermosetting block copolymer coating composition.

2. The method in claim 1 wherein the polyester resin is prepared by reacting a polyhydric alcohol and a polybasic acid.

3. The method in claim 2 wherein the polyhydric alcohol is a member of the group consisting of ethylene glycol, trimethylolpropane, neopentyl glycol, glycerol, and pentaerylthritol.

4. The method in claim 2 wherein the polybasic acid is a member of the group consisting of maleic acid, isophthalic acid, adipic acid and fumaric acid.

5. The method in claim 1 wherein the mercaptan is a member of the class consisting of mercaptoacetic acid, 2-mercaptoethanol, and 2,3-dimercapto-1-propanol.

6. The method in Claim 1 wherein the ethylenically unsaturated monomer is a member of the class consisting of acrylates, methacrylates, vinyl aromatic hydrocarbons, unsaturated acids and unsaturated esters of organic acids.

7. A method which comprises the steps of:
  A. esterifying a polyol with a carboxyl functional mercaptan having a hydrocarbon chain containing up to about 18 carbon atoms to provide a mercapto-terminated reaction product; and
  B. reacting said mercapto-terminated reaction product in the presence of molecular oxygen with one or more ethylenically unsaturated monomers to produce a thermosetting block copolymer coating composition.

8. The method in claim 7 wherein the polyol is a member of the group consisting of polycaprolactone, 2,2-dimethyl-3-hydroxypropyl-2,2-dimethyl-3-hydroxypropionate and 2-methyl-2-ethyl-1,3-propanediol.

9. The method in claim 7 wherein the ethylenically unsaturated monomer is a member of the class consisting of acrylates, methacrylates, vinyl aromatic hydrocarbons, unsaturated acids and unsaturated esters of organic acids.

10. A method of producing a thermosetting block copolymer coating composition which comprises the steps of:
  A. esterifying polycaprolactone polyal with mercaptoacetic acid to provide a mercapto-terminated reaction product; and
  B. reacting said reaction product of (A) in the presence of molecular oxygen with diacetone acrylamide, 2-hydroxy-ethyl acrylate, acrylic acid and methyl methacrylate to provide a block copolymer.

11. The method which comprises the steps of:
  A. reacting a polyester resin or polyol with an organoalkoxysilane selected from the group consisting of alpha-acryloxyalkoxysilane and alpha-methacryloxyalkoxysilane to produce a product having at least two functional groups present for reaction with a hydroxyl functional mercaptan or a carboxyl functional mercaptan;
  B. reacting said product with a hydroxyl functional mercaptan having a hydrocarbon chain containing up to about 18 carbon atoms or a carboxyl functional mercaptan having a hydrocarbon chain containing up to about 18 carbon atoms in an amount sufficient to block at least two polyester functional groups to provide a mercapto-terminated reaction product; and
  C. reacting said mercapto-terminated reaction product in the presence of molecular oxygen with one or more ethylenically-unsaturated monomers to produce a thermosetting block copolymer coating composition.

12. The method in claim 11 wherein the mercaptan is a member of the class consisting of mercaptoacetic acid, 2-mercapto-ethanol, and 2,3-dimercapto-1-propanol.

13. The method in claim 11 wherein the organoalkoxysilane is alpha-methacryloxypropyltrimethoxysilane.

14. A method which comprises the steps of:
  A. reacting polycaprolactone polyol with an organoalkoxysilane selected from the group consisting of alpha-acryloxyalkoxysilane and alpha-methacryloxyalkoxysilane and reacting the product with mercaptoacetic acid to provide a mercapto-terminated reaction product; and
  B. reacting said reaction product of (A) in the presence of molecular oxygen with diacetone acrylamide, 2-hydroxyethyl acrylate, methacrylic acid, and ethyl acrylate to provide a block copolymer coating composition.

* * * * *